United States Patent [19]
Alberts

[11] 4,131,381
[45] Dec. 26, 1978

[54] MEANS AND METHOD FOR MOUNTING A STRUCTURE ON A SHAFT

[76] Inventor: Albert K. Alberts, 1084 Canyon Crest Dr., Bountiful, Utah 84010

[21] Appl. No.: 853,117

[22] Filed: Nov. 21, 1977

[51] Int. Cl.² .............................................. B25G 3/00
[52] U.S. Cl. .................................. 403/353; 403/376; 403/375; 29/159 R
[58] Field of Search ............... 403/316, 317, 318, 375, 403/376, 383, 353, 355; 74/230.3, 440; 29/159 R, 526 R

[56] References Cited

U.S. PATENT DOCUMENTS

| | | | |
|---|---|---|---|
| 2,200,245 | 5/1940 | Schultz | 29/159 R X |
| 2,776,356 | 1/1957 | Kling | 403/353 X |
| 3,719,103 | 3/1973 | Streander | 74/440 X |
| 3,766,636 | 10/1973 | Sygnator | 29/526 |

FOREIGN PATENT DOCUMENTS 2704198 8/1977 Fed. Rep. of Germany ........... 403/353

*Primary Examiner*—Wayne L. Shedd
*Attorney, Agent, or Firm*—Mallinckrodt & Mallinckrodt

[57] ABSTRACT

A structure having a close-fitting opening for freely receiving a shaft is secured to the shaft, usually for rotation therewith, by attachment, as by bolting, to a securement plate that has an opening therethrough with a main shaft-receiving portion and an auxiliary portion, the latter being extended laterally from the main portion and defined by respective rectilinear rail formations which intercept the main portion of the opening and have been slid into and snugly received by respective grooves provided in diametrically opposite sides of the shaft.

9 Claims, 5 Drawing Figures

MEANS AND METHOD FOR MOUNTING A STRUCTURE ON A SHAFT

BACKGROUND OF THE INVENTION

1. Field

The invention is in the field of means and methods for securing various structures to shafts, usually gears, pulleys, and the like for rotation with the shafts.

2. State of the Art

Currently used methods and apparatus for attaching structures to shafts for rotation therewith include the use of keyways and keys, pressure fits, etc. There has remained the need for a simple and effective way of mounting a structure on a shaft so the resulting joinder will be secure and strong and yet provide for easy removal and replacement of the structure.

SUMMARY OF THE INVENTION

According to the invention a structure, such as a gear or pulley having a close-fitting opening for freely receiving a shaft, is secured to the shaft, usually for rotation therewith, by fastening it to a plate that has rail members which have been slid into mating relationship with substantially rectilinear slideway grooves formed in diametrically opposite sides of the shaft. The securement plate has an opening therethrough, with a main shaft-receiving portion and an auxiliary portion, the latter being extended laterally from the main portion and defined by respective rectilinear rail formations which intercept the main portion of the opening and are adapted to slide into and be snugly received by the respective grooves provided in the shaft. After the rail formations have been mated with the grooves in the shaft, the securement plate and the structure are fastened together, as by bolting.

It is preferred that the securement plate by symmetrical in shape and that its opening have two main shaft-receiving portions symmetrically located with respect to the center of the plate and that the auxiliary portion of the opening extends between and interconnects the two main portions. This configuration balances the securement plate for rotation.

THE DRAWINGS

In the accompanying drawings, which illustrate embodiments presently contemplated as the best mode of carrying out the invention:

FIG. 1 is a perspective view of a gear mounted on a shaft by means of the invention;

FIG. 2, a vertical section taken on the line 2—2 of FIG. 1;

FIG. 3, a vertical section taken on the line 3—3 of FIG. 2;

FIG. 4, a view corresponding to that of FIG. 2, but showing a different embodiment of the invention; and FIG. 5, an exploded pictorial view of the embodiment of FIG. 4.

DETAILED DESCRIPTION OF THE ILLUSTRATED EMBODIMENTS

Figure 1:
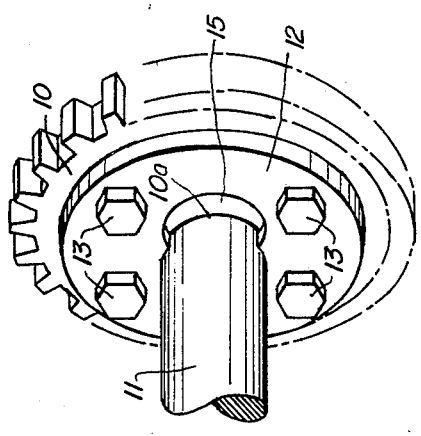
Figure 2:
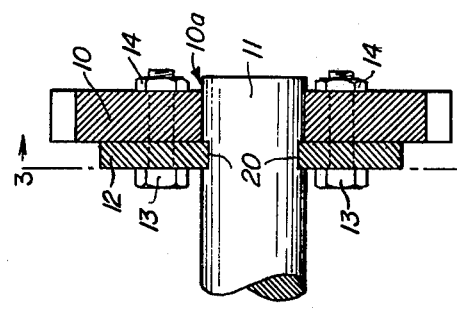
Figure 3:
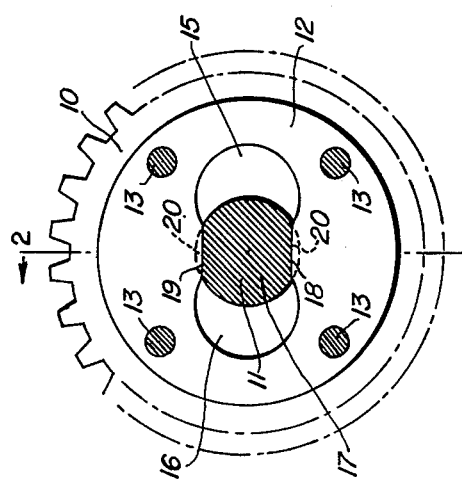

As illustrated in FIGS. 1, 2, and 3, structure in the form of a gear 10 is secured to a shaft 11 for rotation therewith by fastening it to a securement plate 12 which is, itself, attached to the shaft. In this instance, gear 10 is fastened to securement plate 12 by four bolts 13 and their nuts 14.

Gear 10 has an opening 10a through its center, which closely fits shaft 11 but is large enough so that gear 10 can be freely slid along shaft 11 prior to being fastened to securement plate 12.

Securement plate 12 has an opening therethrough, which, in this instance comprises two off-center main portions 15 and 16, each adapted to freely receive shaft 11, and an auxiliary portion 17 interconnecting the main portions and defined by mutually opposite rail formations 18 and 19. When shaft 11 is received by either opening 15 or 16, the securement plate can be slid freely along the shaft.

Shaft 11 is provided with rectilinearly bottomed grooves 20, FIG. 3, in respective diametrically opposite sides thereof and extending transversely of the axis of the shaft. Such grooves are located intermediate the length of shaft 11 and provide substantially rectilinear slideways for receiving rail formations 18 and 19 of securement plate 12 when such securement plate has been slid along the shaft until it is in lateral registry with grooves 20. Sliding plate 12 laterally with respect to the shaft will place the rail formations in snug mating engagement with the grooves. It should be noted that the defining faces of the respective grooves need not be rectilinear so long as the grooves themselves provide rectilinear slideways for the rail formations. For example, the bottom of a groove 20 could be concave or the sides could be of various configurations and still provide a slideway to mate rectilinearly with a rail portion 18 or 19.

With the rail portions 18 and 19 of securement plate 12 snugly engaged by the respective grooves 20, the securement plate is held so that it rotates with shaft 11. When such plate 12 is in this position on the shaft, the structure (here gear 10) to be secured on the shaft for rotation therewith is slid onto or along the shaft and positioned so that it can be attached to securement plate 12. The structure may be placed on the shaft first, and then moved into position for attachment to the securement plate after such plate has been positioned on the shaft, or it may be placed on the shaft after positioning of the securement plate, depending upon the circumstances. As shown, securement plate 12 and gear 10 are contiguous, but they need not be. Bolts 13 could be elongated if it was desired to position plate and structure at different locations along the shaft.

After being fastened to gear 10, securement plate 12 is securely held against lateral movement, and, similarly, gear 10 is securely held against longitudinal movement along the shaft. If gear 10 needs to be removed for any reason, such as for replacement, this may easily be accomplished by removing nuts 14 from bolts 13 and sliding the gear off the shaft. Plate 12 may then be slid laterally with respect to the shaft to position the shaft in one of the main portions 15 or 16 of the opening through the plate, and the plate may then be slid off the shaft. Thus, attachment and removal of the structure is easily accomplished, but, when secured, the structure is held tightly in place.

Figure 4:
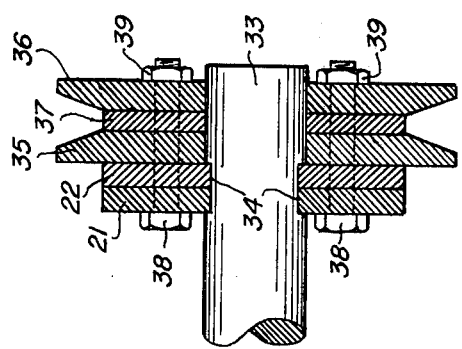
Figure 5:
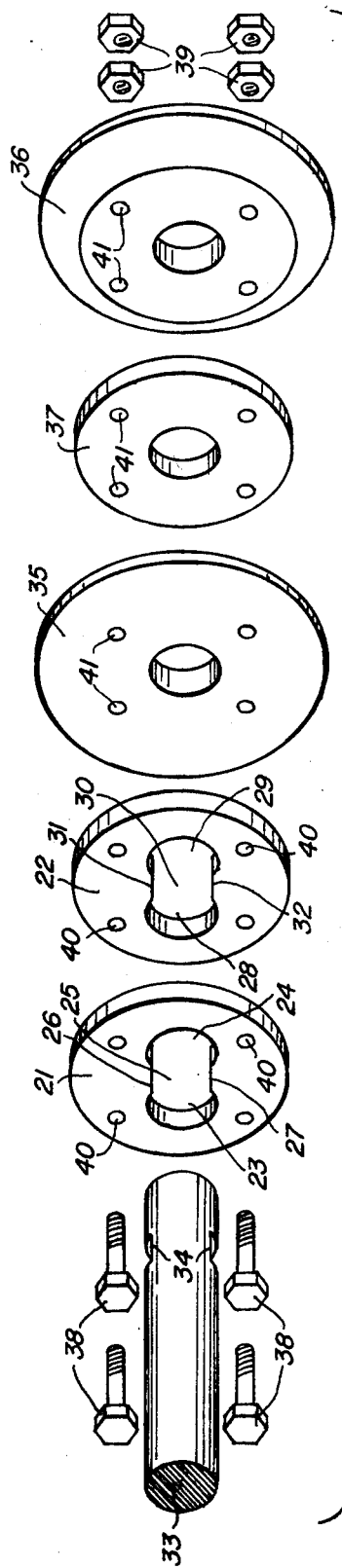

A second embodiment of the invention is shown in FIGS. 4 and 5. Here, too, securement plates 21 and 22, each similar to the securement plate 12, are provided. Plate 21 has an opening with main shaft-receiving portions 23 and 24 interconnected by an auxiliary portion 25, which is defined by rectilinear rails 26 and 27, the plate 22 has an opening with main shaft-receiving portions 28 and 29 interconnected by an auxiliary portion 30, which is defined by rectilinear rails 31 and 32. Also provided is a shaft 33 having grooves 34 corresponding to but twice as wide as the grooves 20 in shaft 11.

Shaft 33 is received by either one or the other of the main portions of the openings in the two securement plates, and such plates are slid along the shaft face-to-face until their rails are in lateral registry with grooves 34. The plates are then slid laterally simultaneously, so that their rails engage the grooves, two by two, but each plate could be moved along the shaft and slid into the groove separately.

In this instance, the structure to be secured on shaft 33 is a pulley made up of a pair of beveled discs 35 and 36, respectively, and an intermediate disc 37 of diameter equal to the diameter of discs 35 and 36 at the inward edges of their respective bevels. The three discs are provided with registering central openings corresponding to the opening 10a of gear 10 for receiving shaft 33 in a close but sliding fit, and with four sets of registering holes for receiving respective bolts 38 which are secured by nuts 39.

Corresponding bolt holes 40 in securement plates 21 and 22 are preferably positioned slightly to one side of exact registration along a circle interconnecting their centers so that, when these plates are bolted together along with the pulley structure (whose components are provided with bolt-receiving holes 41) one of the plates is rotated very slightly in relation to the other, thus causing the rail portions of one of the plates to be rotated slightly out of registry with the rail portions of the other plate. This results in an extra tight fit against grooves 34 of the shaft and eliminates any play that may occur if the rails and grooves are not otherwise completely snug. Similar results can be obtained if screws, rivets, or the like are subtituted for the bolts as fastening means.

Multiple securement plates as shown in FIGS. 4 and 5 (any number could be used) may also be desirable to give greater area of surface contact between the securement plate rails and the bottoms of their receiving grooves in the shaft. Such an increase in area of surface contact may be desirable in various instances of use of the invention, since, upon acceleration or deceleration of the shaft, torque is transmitted from the shaft to the securement plate or plates along essentially a line contact extending across the width of the groove and the width of the rail or rails at one end thereof as mated. By increasing the thickness of a single securement plate or of an assembly of same and the widths of the respective rail-receiving grooves, the torque-transmitting area of contact is increased. Rather than using several securement plates in face-to-face relationship for this purpose, one plate of any desired thickness could be used.

It is preferred that the opening in a securement plate have two main portions symmetrically located at opposite ends of an interconnecting auxiliary portion, as is illustrated for both embodiments. In this way, the plate is balanced for rotation on the shaft. For the same reason, the bolts or other attachment devices holding the securement plate or plates and the structure together should be symmetrically arranged. However, in instances in which balance is not important, the securement plate can be provided with an opening having only one main portion to receive the shaft and an auxiliary portion extending therefrom, or, if balance is important, the same arrangement can be employed and the resulting unit balanced in some other way, as by the attachment of strategically located weights, to provide smooth rotation with the shaft. Such balancing could be obtained, however, by a suitable unsymmetrical arrangement of the bolts or other means attaching the structure and the securement plate or plates together.

It will also be seen that the shaft-receiving opening through the structure need have a snug fit only on the two sides of the shaft that extend between the grooves. This is to keep the securement plate or plates from sliding laterally out of engagement with the grooves. The securement plate or plates will keep the structure from moving axially along the shaft, while such structure, if it is snug fitting on the two sides of the shaft that extend between the grooves, will prevent the securement plate or plates from sliding transversely of the axis of the shaft. This maintains the structure securely on the shaft.

Whereas this invention is here illustrated and described in detail with respect to embodiments presently contemplated as the best mode of carrying out the invention in actual practice, it should be understood that various changes may be made within the scope of the broader teachings hereof and the claims that follow.

I claim:

1. A mechanical assembly for mounting on a shaft that has transverse grooves in respective diametrically opposite sides thereof intermediate its length, said grooves providing substantially rectilinear slideways, the assembly comprising a structure to be secured to the shaft for rotation therewith, said structure having a close-fitting opening for freely receiving the shaft; a securement plate having an opening with a main portion adapted to receive the shaft and with an auxiliary portion extended laterally from said main opening and defined by mutually opposite rail formations for snugly receiving the grooved portion of the shaft when such grooved portion and said plate are in lateral registry; and means for securely fastening the securement plate to said structure when said plate is positioned on said shaft with its rail formations in mating relationship with said grooves of the shaft.

2. A mechanical assembly according to claim 1, wherein the opening in the securement plate has two symmetrical main portions adapted to receive the shaft, and wherein the auxiliary portion of the opening extends between the two main portions thereof, interconnecting said two main portions.

3. A mechanical assembly according to claim 1, wherein there are at least two similar securement plates adapted to be positioned in substantially face-to-face relationship and to be received by the grooved portion of the shaft and to be fastened together after the respective rail formations of the auxiliary portions of their respective openings have been brought into mating relationship with the grooves in the shaft; wherein the fastening means are bolts or the like and respective receiving openings therefor through said plates, the receiving openings in one of the plates being slightly out of registry with those in another one of the plates in the same direction along a circle interconnecting the centers of said openings in order to obtain extra tight securement of the structure to the shaft.

4. A device for use in fixedly securing a structure to a shaft for rotation therewith, said device comprising a plate having an opening therethrough for receiving a shaft provided with transverse grooves forming substantially rectilinear slideways in respective diametrically opposite sides thereof intermediate its length, said opening in the plate having a main shaft-receiving portion and an auxiliary portion extended laterally from said main portion and defined by respective rectilinear rail formations which intercept said main portion of the opening and are adapted to slide snugly into the respective grooves of the shaft.

5. A device according to claim 4, wherein the opening in the plate has two symmetrical main portions adapted to receive a shaft, and wherein the auxiliary portion of the opening extends between the two main portions thereof, interconnecting said two main portions.

6. In combination, a shaft having transverse grooves forming substantially rectilinear slideways in respective diametrically opposite sides thereof intermediate its length; structure to be secured to the shaft for rotation therewith, said structure having a close-fitting opening for receiving the shaft; a securement plate having an opening adapted to receive the shaft with a portion extended laterally from said opening and defined by mutually opposite rail formations for snugly receiving the grooved portion of the shaft when such grooved portion and said plate are in lateral registry; and means for securely fastening the securement plate to said structure when said plate is positioned on said shaft with its rail formations in mating relationship with said grooves of the shaft.

7. A combination according to claim 6, wherein the opening in the securement plate has two symmetrical main portions adapted to receive the shaft, and wherein the auxiliary portion of the opening extends between the two main portions thereof, interconnecting said two main portions.

8. A combination according to claim 6, wherein the combination includes at least two similar securement plates adapted to be positioned in substantially face-to-face relationship and to be received by the grooved portion of the shaft and to be fastened together after the respective rail formations of the auxiliary portions of their respective openings have been brought into mating relationship with the grooves in the shaft; wherein the fastening means are bolts or the like and respective receiving openings therefor through said plates, the receiving openings in one of the plates being slightly out of registry with those in another one of the plates in the same direction along a circle interconnecting the centers of said openings in order to obtain extra tight securement of the structure to the shaft.

9. A method of fixedly securing a structure to a shaft for rotation therewith, said structure having a close-fitting opening for receiving the shaft and the shaft having transverse grooves forming substantially rectilinear slideways in respective diametrically opposite sides thereof intermediate its length, said method comprising obtaining a securement plate with an opening having a main portion adapted to receive the shaft and having an auxiliary portion extended laterally from said main portion for snugly receiving the grooved portion of the shaft when either the shaft or the plate is displaced laterally at such time as the grooved portion of the shaft and said plate are in lateral registry, said auxiliary portion of the opening being defined by mutually opposite, rectilinear rail formations which intersect said main opening and are adapted to mate with the respective grooves of the shaft; inserting the shaft through said main portion of the opening in the plate to bring said rail formations into lateral registry with the grooves of the shaft; displacing either the shaft or the plate laterally to place the plate into mating position with the grooves of the shaft; sliding said structure onto the shaft; and securely fastening the plate and the structure together.

* * * * *